Nov. 2, 1943.　　　　I. R. SMITH　　　　2,333,617
BATTERY-CHARGING SYSTEM
Filed May 31, 1940
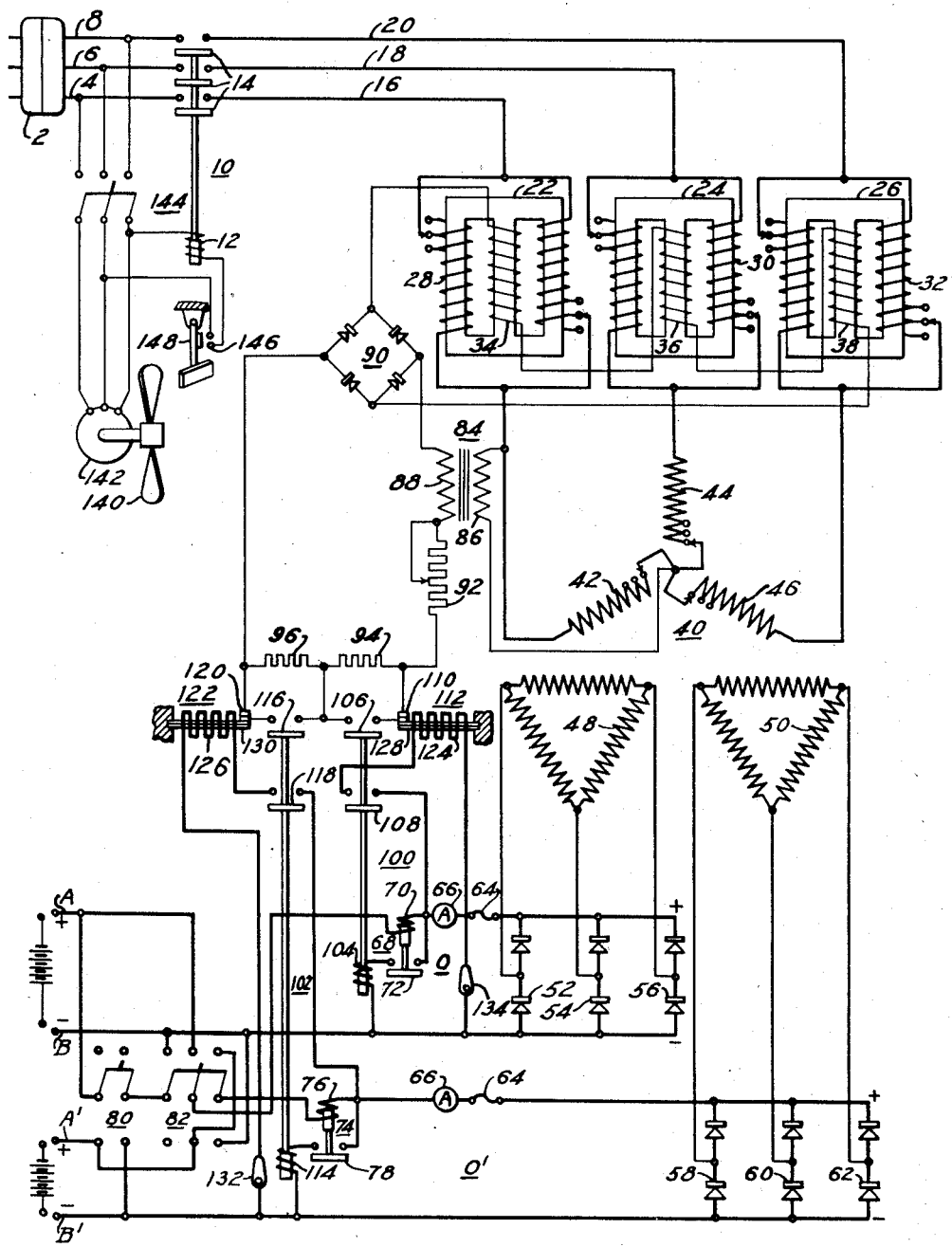
WITNESSES:
N. F. Susser
B. L. Zangwill
INVENTOR
Irving R. Smith.
BY O. B. Buchanan
ATTORNEY Patented Nov. 2, 1943

2,333,617

UNITED STATES PATENT OFFICE 2,333,617

BATTERY-CHARGING SYSTEM

Irving R. Smith, Forest Hills, Pa., assignor to Westinghouse Electric & Manufacturing Company, East Pittsburgh, Pa., a corporation of Pennsylvania Application May 31, 1940, Serial No. 338,077

8 Claims. (Cl. 320—15)

My invention relates, generally, to battery-charging systems of the types in which available alternating-current is converted into direct-current having a voltage suitable for charging storage batteries.

It is an object of my invention to provide a battery-charging system which is simple in design, rugged in construction, foolproof in use, and which can be utilized for charging either lead-plate storage batteries or Edison-type storage batteries.

It is a general purpose of my invention to provide a battery-charging system in which motor-generator sets are eliminated, and to this end my system utilizes transformers, regulated by saturable-core reactors, which have secondaries connected to rectifiers of the dry-contact type, such as, for example, rectifiers composed of stacks of plates, each having a copper-oxide surface, and more commonly known as copper-oxide rectifiers, but other types of rectifiers can also be utilized in my system. The system of my invention is especially useful where the alternating-current voltage of the system is susceptible to relatively appreciable variations such as occur, for example, in portable systems having long lead lines terminating in a plug to be plugged in a suitable receptacle or outlet connected to a power supply.

It is an object of my invention to provide a system which may be utilized to charge one or more storage batteries, each comprising a plurality of cells, and to so control the charging rate that when one battery alone is being charged, a greater charging rate is available. In general, my invention is such as to provide a regulatable but substantially constant-current charging rate.

Many other objects and features of my invention, in addition to those recited above, will be apparent from the following description thereof, which is to be taken in conjunction with the single figure drawing schematically representing a wiring diagram of a preferred embodiment of my invention.

The system of my invention is especially useful for use in small portable units which are to be transported from place to place for the purpose of charging batteries at a high rate, and generally comprises a plug or other suitable connecting means by which the unit may be connected to an alternating-current power supply line which energizes a converting means for converting the alternating-current to the desired direct-current. This converting means comprises a transformer means for stepping down the commercially available alternating-current voltages to voltages suitable for charging batteries, a regulating means for controlling the output voltage of the transformer means, a rectifying means for converting the output voltage of the transformer means into unidirectional current, which is hereinafter designated as direct current, and suitable regulating, controlling and protective means rendering the system a complete entirety.

Referring more particularly to the figure, the plug 2 represents any suitable means by which the system can be connected to a power supply line, in this case a 3-phase line. Extending from the plug are the three supply lines 4, 6 and 8, each indicative of a separate phase conductor which may be of extensive length. A main circuit breaker 10, comprising an operating coil 12 and contactors 14, controls the connections between the supply lines 4, 6 and 8 and feeder extensions 16, 18 and 20 for the battery charging system.

Variable impedance means in the form of saturable reactors 22, 24 and 26 are connected in each of the phase line extensions 16, 18 and 20, the saturable reactors comprising impedance windings 28, 30 and 32, each consisting of parallel windings, and impedance-control windings 34, 36 and 38, respectively, for each reactor, the control windings being connected in series in a suitable direct-current control circuit to be later described.

A transformer, indicated in its entirety by the reference numeral 40, has a primary comprising three Y-connected primary windings 42, 44 and 46, having input ends respectively connected to the associated impedance windings 28, 30, and 32, and a pair of insulated secondaries 48 and 50, each comprising delta connected secondary windings.

The delta points of the secondary 48 are each connected to the midpoint of a set of rectifier groups 52, 54 and 56, the groups comprising serially stacked dry-plate rectifiers. The groups are connected in parallel for full-wave rectification and energize a charging circuit 0 which supplies direct-current across terminals A and B, the terminal A being positive and the terminal B negative.

The delta points of the secondary 50 also are connected to the midpoints of a second set of rectifier groups 58, 60 and 62, similar to the first set, the outputs of which are connected in parallel to a charging circuit 0' terminating in terminals A' and B', A' being positive and B' negative.

Fuses 64 and ammeters 66 are serially connected in each of the charging circuits, preferably close to the positive terminal of the rectifier sets. Serially connected in the charging circuit 0 is a current-flow responsive relay 68 having an operating coil 70 and a contactor 72, and a similar relay 74, having an operating coil 76 and contactor 78, is connected in the charging circuit 0'.

The charging circuits 0 and 0' may be used separately to charge separate batteries, or connected either to charge two batteries in series or to charge one battery at double the current. For this purpose, two multiple switches 80 and 82 are provided. With the switch 80 open and the switch 82 in the up position (with respect to the drawing), a suitable battery may be connected across the terminals A—B and a second battery across the terminals A'—B', in which case both batteries would be charged at a predetermined rate determined by the characteristics of the system. If, however, it is desired to charge one battery at double the rate, then the battery across one of the terminals is disconnected and the switch 80 thrown to the down closed position, in which case the two charging circuits 0 and 0' together charge the remaining battery at approximately double the charging rate of a single circuit.

If two batteries are to be charged in series, then the switch 82 is thrown to the down position and the switch 80 opened. In this last instance instead of two batteries, one battery of double the number of cells can be charged.

The charging rate is controllable by a number of adjustable means. Thus, each of the impedance windings 28, 30 and 32 may be provided with adjustable taps, and the primary windings 42, 44 and 46 similarly provided with adjustable taps. Additionally, the control windings of the saturable reactors are in a direct-current control circuit having variable or adjustable impedances in the form of resistances.

The control circuit is energized through a transformer 84 having a primary 86 connected across one of the primary windings of the transformer 40 or, alternatively, if desired, across a phase of the supply lines, and a secondary winding 88 in the control circuit. The secondary winding feeds the input terminals of the fullwave rectifier 90 of the dry contact type, through a serially connected adjustable resistance 92 and two equal resistances 94 and 96 which may also be adjustable. The series-connected control windings 34, 36 and 38 are connected to the output terminals of the rectifier 90. Accordingly the control circuit is completely closed, being energized through the transformer 84.

Where the system is used to charge lead-plate batteries, it is desirable to provide a reduced finishing charge after the batteries have obtained a predetermined charge. For this purpose, each of the charging circuits 0 and 0' is provided with relays 100 and 102, respectively, controlled by the contactors 72 and 78, respectively. The relay 100 has an operating coil 104 and a pair of contactors 106 and 108. The contactor 106 is in a circuit paralleling the resistor 94, the circuit further including a pair of normally closed contacts 110 of a combination voltage and thermal relay 112.

The relay 102 includes an operating coil 114 and a pair of contactors 116 and 118. The contactor 116 is serially connected in a circuit paralleling the resistance 96, the circuit further including normally closed contacts 120 of a second voltage and thermal relay 122. Each of the relays 112 and 122 comprises a heater winding 124 and 126, respectively, and a bimetallic strip 128 and 130, respectively, heated thereby.

Each heater winding is connected across a respective charging circuit 0 or 0' and will generate heat for heating its associated bimetallic strip in accordance with the voltage present across the lines of the circuit to which it is connected. Since the heater circuits also include in series the contactors 108 and 118, respectively, they can not be energized unless power is available in the corresponding battery charging output circuits.

In the preferred form of operation of the system, the bimetallic strips 128 and 130 are exposed to the ambient temperature about the batteries, as well as to the action of their heater coils, so that when the surrounding atmosphere is relatively colder, batteries will be charged relatively longer and to a higher voltage before the application of the reduced finishing charge.

The operation of the different relays upon the direct current control circuit for the saturable reactors is as follows: Assuming both charging circuits to be supplying charging current, the relays 68 and 74 will have closed the circuit to the operating coils of the relays 100 and 102, which will become energized if voltage is present across the charging circuits 0 and 0'. Assuming this condition, the relays 100 and 102 close their contactors to establish a circuit for the heater windings 124 and 126, respectively, and to short circuit the resistances 94 and 96 so long as the pairs of contacts 110 and 120 remain closed. Consequently, a relatively high direct-current flows through the control windings 34, 36 and 38, the magnitude being determined solely by the then effective value of the resistance 92, and a relatively high charging rate results.

If the batteries being charged are lead-plate batteries, switches 132 and 134 are maintained in closed position so that the heater windings 124 and 126 will be energized. As the voltage of the batteries increases, due to charging, the heat supplied by the heater windings to the bimetallic strips 128 and 130 increases until the contacts 110 or 120, or both, open, removing the short circuit across the resistances 94 or 96, as the case may be. In such case the exciting current in the control windings 34, 36 and 38 decreases, thereby increasing the impedance in the lines energizing the primary windings of the transformer 40. This decreases the supply voltage to the sets of rectifiers in the charging circuits and thereby decreases the charging current so that the batteries will be charged at the finish rate. By controlling the point at which the relays 100 and 102 operate, or the heating by the heating windings, or the displacement of strips 128 and 130 required to effect separation of contacts 110 and 120, the charging rate may be made to reduce at the proper point of the battery charge, preferably the gassing point or when a predetermined voltage is reached. By exposing the bimetallic strips 128 and 130 to the ambient temperature, it is quite clear that the finish charge will not become effective until the battery or batteries have been charged for a longer or shorter time, depending on the ambient temperature, since it will require more or less voltage across the charging circuit or circuits to compensate for colder or warmer ambient temperatures.

If Edison-type batteries are being charged, it is, of course, unnecessary to provide a reduced finish charge. In such case the switches 132 and 134 may be opened, opening the heater circuits so that the contacts 110 and 120 remain closed, and because the contactors 106 and 116 will be in closed position the charging rate will always be at the higher rate.

It is desirable to cool the rectifiers during operation, and to this end the rectifiers are placed in the path of a blast of air from a fan 140 driven by a motor 142. The motor 142 is connected to the supply lines 4, 6 and 8 through a breaker 144 of the type having self-contained protection against overload.

Protective means are provided to prevent energization of the system in the event the fan 140 is not operating properly, this protective means comprising a normally open switch 146 which is closed when the fan is providing a blast of air in the proper direction for cooling the different rectifiers of the system. In this particular embodiment, the switch 146 has an operating member 148 comprising a small vane in the path of the blast of air from the fan 140. When this blast is in the proper direction and of suitable intensity, the fan 140 closes the switch 146, thereby energizing the operating coil 12 of the main circuit breaker 10, closing the contactors 14.

It is quite evident, therefore, that to initiate operation of the battery-charging system, the plug 2 is disposed in a convenient receptacle and the breaker 144 closed. This energizes the fan motor 142 to create the necessary blast for closing the switch 146 which will operate the circuit breaker 10 for energizing the charging system.

It may be observed that the relays 100 and 102 are controlled by the current flow responsive relays 68 and 74, respectively. This prevents an excess open-circuit voltage across the rectifiers, and also automatically keeps the rate of charge in either charging circuit substantially constant, regardless of whether the other circuit is operative or not. Thus, if the output circuits 0 and 0' were charging separate batteries and both batteries were taken off, the voltage across the rectifiers would ordinarily rise. However, since removal of the batteries stops current-flow through relays 68 and 74, relays 100 and 102 will be deenergized, thereby inserting resistances 94 and 96 in the direct-current control circuit of the saturable reactors, increasing their impedance. If only one battery were taken off, one of the relays 68 or 74 would be deenergized, and the corresponding resistance 94 or 96 would be inserted in the direct-current control circuit.

By the use of saturable reactor means in the energizing circuit of the transformer primary, which variably supplies energy to the direct-current control circuit of the saturable reactor means, the charging rate is maintained fairly uniform in spite of normal variations in the line supply voltage, and moreover, the charging rate can be very nicely adjusted.

The system I have described is useful for charging either of the more common well known types of storage batteries and has provision for charging lead-plate batteries with a reduced finish charge.

The system is provided with full protective means rendering it substantially foolproof. In the event the main sets of rectifiers connected to the secondaries 48 and 50 should become defective or fail and, therefore, short circuit, fuses 64 will burn out before any serious damage can arise. Additionally, the system cannot be energized unless the fan 140 is operating properly.

In an actual embodiment of my invention, all the manually adjustable controls are brought out to a panel and it is preferable to dispose the ammeters 66 near the adjustable means of the resistance 92 so that the charging rate can be readily observed during the adjustment of this resistance. A system built in accordance with my invention can be readily and easily adjusted to take care of any aging of the rectifiers either by adjusting the primary windings of the transformer 40 by means of the taps provided thereon, or even by selecting the taps on the impedance windings of the saturable reactors.

While I have described my invention in an embodiment which I now prefer, it is obvious that many modifications may be made therein and that elements, or combinations of elements, equivalent to those described may be substituted.

I claim as my invention:

1. A battery-charging system for converting alternating-current to direct-current suitable for charging one or more storage-batteries, comprising in combination, a plurality of battery-charging load circuits, an alternating-current supply line, converting means, comprising transformer means and variable impedance means controlling the energization of said transformer means, connected to said supply line and to said battery-charging circuits for converting the alternating-current to a plurality of direct-current outputs each of which is associated with a single one of said battery-charging circuits and is suitable for battery-charging, said converting means including control means for controlling the impedance of said variable impedance means, and means under joint control of said battery-charging circuits, for controlling the effect of said control means in a manner so as to be dependent upon electrical conditions in the respective battery-charging circuits.

2. A battery-charging system for converting alternating-current to direct-current suitable for charging one or more storage-batteries, comprising in combination a plurality of battery-charging load circuits, an alternating-current supply line, converting means connected to said supply line for converting the alternating-current to a plurality of direct-current outputs suitable for battery-charging and each of which is applied to a single one of said battery-charging circuits, said converting means including a set of rectifiers for each of said battery-charging circuits, said converting means further including saturable reactor means for controlling the direct-current voltage-outputs of said converting means, said saturable reactor means including control winding means, a single control circuit comprising a variable impedance, said single control circuit including said control winding means, and means associated with each of said battery-charging circuits for controlling the impedance in said single control circuit in accordance with an output characteristic of each of the associated battery-charging circuits, whereby to control the direct-current voltage-outputs of said converting means.

3. A battery-charging system adapted to convert alternating-current to direct-current suitable for charging one or more storage-batteries, comprising, in combination, transformer means including a primary and a plurality of secondaries energized by said primary, variable saturable reactor means connected to said primary for variably controlling the energization of said primary, separate rectifier means connected to each of said secondaries, each of said rectifier means having an independent direct-current output circuit for charging storage-batteries, and means under joint control of said direct-current circuits for controlling the saturation of said saturable reactor means whereby the battery charging rate of each of said direct-current output circuits effects the output of said rectifier means.

4. A system of the type described adapted to convert alternating-current to direct-current adapted for charging one or more storage-batteries, comprising a plurality of saturable reactor means, transformer means having a plural-winding primary series-connected with said plurality of saturable reactor means to an alternating-current supply, said transformer means being provided with a plurality of secondaries having outputs dependent upon the energization of said primary, individual rectifier means for each of said secondaries, a direct-current output circuit for each of said rectifier means, storage-batteries connected to each of said direct-current output circuits, a closed single control circuit for said saturable reactor means, said single control circuit having variable impedance means for controlling the current-flow in said single control circuit for controlling the saturation of said saturable reactor means whereby the output of each of said secondaries is controlled, and means for each of the direct-current output circuits, separately responsive to electrical conditions in the associated direct-current circuit, for further controlling said variable impedance means.

5. A system of the type described adapted to convert alternating-current to direct-current adapted for charging one or more storage-batteries, comprising a plurality of saturable reactor means, transformer means having a plural-winding primary series-connected with said plurality of saturable reactor means to an alternating-current supply, said transformer means being provided with a plurality of secondaries having outputs dependent upon the energization of said primary, individual rectifier means for each of said secondaries, a direct-current output circuit for each of said rectifier means, switch means for selectively connecting the direct-current output circuits in series, in parallel, or individually, to power consuming apparatus, a single control circuit for said saturable reactor means, said single control circuit having variable impedance means responsive to an electrical condition in said transformer means for controlling the current-flow in said single control circuit for controlling the degree of saturation of said saturable reactor means whereby the outputs of said secondaries are jointly controlled, and means for each of the direct-current output circuits, responsive to electrical conditions in the associated direct-current circuit, for also controlling said variable impedance means.

6. A system of the type described adapted to convert alternating-current to direct-current adapted for charging one or more storage-batteries, comprising a plurality of saturable reactor means, transformer means having a plural winding primary series-connected with said plurality of saturable reactor means to an alternating-current supply, said transformer means being provided with a plurality of secondaries having outputs dependent upon the energization of said primary, individual rectifier means for each of said secondaries, a distinct independent direct-current output circuit for each of said rectifier means, a closed single control circuit for said saturable reactor means, said single control circuit having variable impedance means with portions associated with each direct-current output circuit, for controlling the current-flow in said single control circuit for controlling the degree of saturation of said saturable reactor means whereby the outputs of said secondaries are simultaneously controlled, and means for each of the direct-current output circuits, responsive to electrical conditions in the associated direct-current circuit, for also controlling the associated portion of said variable impedance means.

7. A battery-charging system adapted to convert alternating-current to direct-current suitable for charging one or more storage-batteries, comprising transformer means including a primary and a plurality of secondaries energized by said primary, variable impedance means connected to said primary for variably controlling the energization of said primary, separate rectifier means connected to each of said secondaries, separate direct-current output circuit means connected to each of said rectifier means, said separate direct-current output circuit means each having a pair of terminals to which a storage-battery is adapted to be connected, and means, comprising a distinct independent control circuit, for controlling said variable impedance means for simultaneously varying the output of said separate direct-current output circuit means, said control circuit being simultaneously responsive to the energization of said transformer means and to electrical conditions in each of said separate direct-current output circuit means.

8. A battery-charging system for converting alternating-current to direct-current for charging one or more storage-batteries, comprising transformer means including a primary and a plurality of secondaries energized by said primary, saturable reactor means having variable impedance means connected to said primary for variably controlling the energization of said primary, separate rectifier means connected to each of said secondaries, a direct-current output circuit means connected, respectively, to each rectifier means, said saturable reactor means having control means for controlling the impedance of said variable impedance means, a closed, independent control circuit, including said control means, for variably controlling said control means, and means responsive to electrical power conditions in each of said direct-current output circuits for controlling said single control circuit.

IRVING R. SMITH.